United States Patent
Aikyou et al.

(10) Patent No.: US 7,816,007 B2
(45) Date of Patent: Oct. 19, 2010

(54) SPHERICAL CARBON PARTICLES AND THEIR AGGREGATES

(75) Inventors: Hiroyuki Aikyou, Yokohama (JP); Toshifumi Shiroya, Yokohama (JP); Masaki Yamamoto, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 168 days.

(21) Appl. No.: 11/665,249

(22) PCT Filed: Oct. 27, 2005

(86) PCT No.: PCT/JP2005/019814

§ 371 (c)(1),
(2), (4) Date: Aug. 15, 2007

(87) PCT Pub. No.: WO2006/046656

PCT Pub. Date: May 4, 2006

(65) Prior Publication Data

US 2008/0027149 A1    Jan. 31, 2008

(30) Foreign Application Priority Data

Oct. 28, 2004  (JP) ............................. 2004-313816
Dec. 14, 2004  (JP) ............................. 2004-361401

(51) Int. Cl.
  B32B 5/16     (2006.01)
  B05D 3/02     (2006.01)
(52) U.S. Cl. .................. 428/403; 427/227; 428/408
(58) Field of Classification Search ................. 428/402, 428/403, 408; 427/227
See application file for complete search history.

(56) References Cited

U.S. PATENT DOCUMENTS

| | | | | | |
|---|---|---|---|---|---|
| 4,136,059 | A | * | 1/1979 | Jalan et al. | 502/101 |
| 4,273,675 | A | * | 6/1981 | Shiiki et al. | 502/9 |
| 4,482,641 | A | * | 11/1984 | Wennerberg | 502/182 |
| 5,501,915 | A | * | 3/1996 | Hards et al. | 429/42 |

(Continued)

FOREIGN PATENT DOCUMENTS

JP    50-64193    5/1975

(Continued)

OTHER PUBLICATIONS

International Search Report for PCT/JP2005/019814 mailed Jan. 24, 2006.

(Continued)

*Primary Examiner*—H. (Holly) T Le
(74) *Attorney, Agent, or Firm*—Nixon & Vanderhye P.C.

(57) ABSTRACT

To provide the spherical carbon particles having a novel structure different from the conventional carbon particles, uniform in shape, well dispersible in solvents and easy to handle.

Spherical carbon particles of 5 nm to 100 μm in diameter having a void or voids enclosed by the carbon crystal wall, which particles have such a structure that the carbon crystal ends are exposed or the carbon net plane is looped at least at a part of the outer periphery of the particles, and an aggregate of spherical carbon particles of 5 nm to 100 μm in diameter having a void or voids enclosed by the carbon crystal wall, which aggregate has such a property that the ratio of the spherical carbon particles having a radial ratio in the range of 1.0 to 1.3 is not less than 40% by number.

5 Claims, 2 Drawing Sheets

(a)　　　　　　(b)　　　　　　(c)

U.S. PATENT DOCUMENTS

| | | | |
|---|---|---|---|
| 5,770,416 A * | 6/1998 | Lihme et al. | 435/176 |
| 6,064,560 A * | 5/2000 | Hirahara et al. | 361/502 |
| 6,515,845 B1 * | 2/2003 | Oh et al. | 361/502 |
| 6,787,029 B2 * | 9/2004 | Gaudet et al. | 210/198.2 |
| 7,601,321 B2 * | 10/2009 | McKinnon et al. | 423/445 R |
| 2002/0015848 A1 * | 2/2002 | Kobayashi | 428/402 |
| 2003/0026755 A1 * | 2/2003 | Jaroniec et al. | 423/449.1 |
| 2006/0216517 A1 * | 9/2006 | Handa et al. | 428/408 |
| 2008/0254296 A1 * | 10/2008 | Handa et al. | 428/408 |
| 2009/0258298 A1 * | 10/2009 | Umeno et al. | 429/231.8 |

FOREIGN PATENT DOCUMENTS

| | | |
|---|---|---|
| JP | 2004-211012 | 1/2003 |
| JP | 2003-137517 | 5/2003 |
| WO | 03/006372 | 1/2003 |
| WO | WO 03/006372 * | 1/2003 |

OTHER PUBLICATIONS

U.S. Appl. No. 11/596,857.
Chemistry of Materials, vol. 15, No. 11, Jun. 3, 2003, pp. 2109-2111.
Advanced Materials, vol. 14, No. 1, Jan. 4, 2002, pp. 19-21.
Advanced Materials, vol. 14, No. 19, Oct. 2, 2002, pp. 1390-1393.
Advanced Materials, vol. 15, No. 2, Jan. 16, 2003.
Chemistry & Physics of Fullerene 2002—pp. 234, 235, with English translation.

* cited by examiner

SPHERICAL CARBON PARTICLES AND THEIR AGGREGATES

This application is the U.S. national phase of International Application No. PCT/JP2005/019814 filed 27 Oct. 2005, which designated the U.S. and claims priority to JP 2004-313816 filed 28 Oct. 2004, and JP 2004-361401 filed 14 Dec. 2004, the entire contents of each of which are hereby incorporated by reference.

TECHNICAL FIELD

The present invention relates to the spherical carbon particles and aggregates of such particles. The invention also relates to a method of producing the spherical carbon particles and a dispersion of the spherical carbon particles.

BACKGROUND ART

Various proposals, such as mentioned below, have been made on the method of producing the carbon particles in recent years.

(1) The core/shell particles of polymethyl methacrylate (PMMA)/polydivinylbenzene (PDVB) are made by polymerization and carbonized to form the hollow carbon particles (Non-Patent Document 1).

(2) The submicron-sized silica particles having a hard core/mesoporous shell structure are made, and by using them as its prototype mold, a phenolic resin or polydivinylbenzene is polymerized in situ. After carbonization, the silica prototype mold is removed (Its prototype mold method 1) (Non-Patent Document 2).

(3) A polymer shell is formed on the surface of colloidal silica, and after carbonization, silica in the shell is dissolved to make the hollow carbon particles (Its prototype mold method 2) (Non-Patent Document 3).

The method of (1) mentioned above is capable of making the particles with a size on the order of 15 nm, but the carbon particles obtained by this method are amorphous with $2\theta=24°$ as determined by X-ray diffractometry (XRD). The proposals of (2) and (3) are the method in which the material is shaped in conformity to the mold, and the shell of the carbon particles obtained from the method of (2) has a mesoporous structure. Although there is no report relating to crystals, it is considered that the development of crystal structure has been neglected because of the advancement of porous structure. Also, these particles are of a spongy structure having mesopores in the surface. According to the method of (3), since divinylbenzene, a crosslinking agent, is used as polymer, it is considered difficult to develop a crystal structure with the obtained carbon particles, because generally it is supposed that the crystal structure can hardly be developed since polydivinylbenzene is carbonized through a solid-phase carbonization reaction.

In addition to the above-mentioned, there has also been reported a carbon particle called "nanopolyhedron particle" (Non-Patent Document 4). This carbon particle has a telescopic structure comprising a pile of several to several ten layers of graphite, presenting a polyhedral configuration as a whole. Just as it is difficult to disperse the carbon nanotubes in a solvent, it is so much difficult and requires much labor and cost to obtain a uniform dispersion of the nanopolyhedron particles. Also, since these nanopolyhedron particles present a polyhedral configuration, they are low in sphericity and poor in uniformity of shape.

There has also been reported a method for obtaining the fibrous carbon particles (carbon nanofibers) using an alumina membrane having pores of 100 nm in diameter and 60 microns in length, in which a heated mesophase pitch is flown into the said pores as a capillary flow and, after particle carbonization, the its prototype mold is dissolved away (Non-Patent Document 5). According to this method, however, since the alumina membrane takes a cylindrical configuration, although it is possible to provide the fibrous carbon particles, it is impossible to create the spherical carbon particles which are perfectly spherical or have a high degree of sphericity.

The carbon spherules having substantially a uniform configuration and a sharp particle size distribution, and a method of producing such carbon spherules have also been reported (Patent Document 1). However, it can be seen from the presented drawings (electron micrographs) that the structure of these carbon spherules has no void in the inside. If a void exists in the inside of the spherule, then the contrast should differ between the peripheral portion and the inside of the particle.

Non-Patent Document 1: Chem. Mater., pp. 2109-2111, Vol. 15, No. 11, 2003

Non-Patent Document 2: Adv. Mater., pp. 19-21, 2002, 14, No. 1, January 4

Non-Patent Document 3: Adv. Mater., pp. 1390-1393, 2002, 14, No. 19, October 2

Non-Patent Document 4: Chemistry and Physics of Fullerene, p. 235, Mar. 15, 2002, published by Nagoya University Publishing Society Non-Patent Document 5: Adv. Mater., pp. 164-167, 2003, 15, No. 2, January 16

Patent Document 1: Japanese Patent Application Laid-Open (KOKAI) No. 2004-211012

DISCLOSURE OF THE INVENTION

Problem to be Solved by the Invention

An object of the present invention is to provide spherical carbon particles having a novel structure different from the conventional carbon particles and applicable to a wide variety of uses, an aggregate of such novel carbon particles, a method of producing them, and a dispersion of the spherical carbon particles. Especially, an object of the present invention is to provide spherical carbon particles which are uniform in shape, excel in dispersibility in solvents and are easy to handle, and an aggregate of such carbon particles.

In the present invention, "aggregate" means a state where the spherical carbon particles of the present invention exist in plurality, and is a concept which embraces both of the condition of the particles being dispersed to a high degree in a dispersant and the dry condition of the particles. "Dispersion" is a concept which refers only to the former of the above definitions.

Means for Solving the Problem

As a result of the present inventors' earnest studies to attain the above objects, it ha been found that it is possible to obtain the spherical carbon particles uniform in shape by using a specific carbonization means, and that such particles have a novel structure which has never been found in the conventional particles. The present invention has been attained on the basis of the above findings.

In a first aspect of the present invention, there are provided spherical carbon particles of 5 nm to 100 µm in diameter having a void or voids enclosed by the carbon crystal wall, which particles have such a structure that the ends of the carbon crystal net plane are exposed or the ends of the carbon net plane are joined together to form a looped structure at least at a part of the outer periphery of the particles.

In a second aspect of the present invention, there is provided an aggregate of spherical carbon particles of 5 nm to 100 µm in diameter having a void or voids enclosed by the carbon crystal wall, which aggregate has such a property that the ratio of the spherical carbon particles having a radial ratio in the range of 1.0 to 1.3 is not less than 40% by number.

In a third aspect of the present invention, there is provided an aggregate of spherical carbon particles having such properties that regarding a dispersion thereof prepared in the manner described below, the particle diameter distribution index represented by the following formula (I), measured after 24-hour standing after preparation of the dispersion, is 0.1 to 20:

<Preparation of Dispersion>

3 ml of a dispersant and 1 mg of a sample are put into a glass vessel having an inner diameter of 13 mm and a capacity of 5 ml and, after fixing the cover in position, the vessel is shaken by an ultrasonic shaker for one minute under the conditions of 120 W high-frequency output and 38 kHz oscillating frequency to disperse the sample.

Particle diameter distribution index=[(diameter of 90 vol % of particles counted from the smallest diameter)−(diameter of 10 vol % of particles counted from the smallest diameter)]/(diameter of 50 vol % of particles counted from the smallest diameter)     (I)

In a fourth aspect of the present invention, there is provided a method of producing the spherical carbon particles comprising using as base material the precursor spherical particles having a diameter of 5 nm to 100 µm, and carbonizing said base material in a state of being covered with a its prototype mold so as to maintain its shape.

In a fifth aspect of the present invention, there is provided a dispersion of spherical carbon particles produced by dispersing the spherical carbon particles as defined in the first aspect in a dispersant.

In a sixth aspect of the present invention, there is provided a dispersion of spherical carbon particles produced by dispersing the aggregate of spherical carbon particles as defined in the second in a dispersant.

In a seventh aspect of the present invention, there is provided a dispersion of spherical carbon particles produced by dispersing the aggregate of spherical carbon particles as defined in the third aspect in a dispersant.

EFFECT OF THE INVENTION

According to the present invention, there are provided the spherical carbon particles having their diameters defined in the range of 5 nm to 100 µm, each of these particles having a void or voids enclosed by the carbon crystal wall. The spherical carbon particles of the present invention can be easily produced by a method using the specific carbonization techniques (production method of the present invention). Also, the spherical carbon particles of the present invention can be dispersed uniformly without cohering to each other in a dispersant, making it possible to evenly derive the desirable electrical properties such as conductivity and field emissivity. Further, their application to DDS (drug delivery system) and use as a lubricant and such are expected.

DESCRIPTION OF REFERENCE NUMERALS AND LETTERS

1: carbon crystal wall
2: void
3: direction of carbon crystal (laminated direction of carbon net plane)
a: a structure where the particle surface side ends of the carbon net plane are not closed
b: a structure where the particle surface side ends of the carbon net plane are joined together

BEST MODE FOR CARRYING OUT THE INVENTION

The present invention will be described in detail hereinbelow, but the present invention is not limited to the embodiments described below but various changes and modifications thereof are possible within the claimed scope of the invention.

First, for the convenience of explanation, the method of producing the spherical carbon particles according to the present invention is described.

In the present invention, the spherical carbonaceous particles (precursor spherical particles) are used as base material. The precursor spherical particles are of a size (diameter) defined in the range of 5 nm to 100 µm. The size (diameter) and shape of the precursor spherical particles (base material) can be confirmed from the observed images by TEM (transmission electron microscope) with a magnification enabling confirmation, for instance, a magnification of ×50,000 or over in case where the particle diameter is on the order of several hundred nm. For more simple operations, SEM (scanning electron microscope) may be used. The same holds true with determination of size (diameter) and shape of the spherical carbon particles of the present invention described later.

As the material (precursor material) of the said precursor spherical particles, it is possible to use any of the materials which can be carbonized in a state of being coated with a heat-resistant material, but preferably a material capable of liquid phase carbonization or containing a pyrolitic heat decomposable polymer is used.

"Liquid phase carbonization" referred to in the present invention designates a carbonization process in which the solid is brought into a fluid state with higher fluidity than the fluid state at glass transition temperature Tg to undergo a thermochemical reaction in liquid phase, producing a situation where migration or orientation of the molecules is relatively prone to take place. Therefore, the "material capable of liquid phase carbonization" signifies a material which is capable of plastic deformation when passed through a heating step under the carbonization conditions specified in the present invention, and this process does not necessarily consist with carbonization in a heating step under the ordinary carbonization conditions with an inert gas.

Examples of the materials capable of liquid phase carbonization usable in the present invention are pitch, polyacrylonitrile, copolymers thereof, polyvinyl alcohol, polyvinyl chloride, phenol resins and rayon. Of these materials, polyacrylonitrile and its copolymers are preferred.

The "pyrolitic decomposable polymer" is a polymer which is usually decomposed when heated to 500° C. or above under normal pressure in an inert atmosphere. Exemplary of such polymers are polystyrene, polymethylacrylate, poly methylmethacrylate, polyethylene and polypropylene, of which polystyrene and polymethylmethacrylate are preferred. These polymers are usually not used as a base material for producing the carbon particles, but according to the present invention, it is considered, quite unexpectedly, that they can be converted into carbon particles because they are carbonized after coated with a heat-resistant material in the method of the present invention.

The following methods can be shown as examples of means for producing the precursor spherical particles using the said materials according to the present invention. In one method, emulsion polymerization, suspension polymerization, soap-free polymerization or other suitable form of polymerization is carried out using as base material a monomer in the said group of polymers (liquid phase carbonizable materials) such as acrylonitrile and, if necessary, additionally using a copolymerizable monomer to obtain as an emulsion the particles of polyacrylonitrile and its copolymer having a uniform size. The copolymerizable monomer used here may be a monomer selected from the group of pyrolitic decomposable polymers mentioned above. According to another method for producing the precursor spherical particles highly uniform in diameter, a monomer in the liquid phase carbonizable material polymers such as acrylonitrile is further added to the pyrolitic decomposable polymer particles obtained from soap-free polymerization, and they are subjected to two-stage soap-free polymerization to obtain the uniform particles of a core/shell structure as an emulsion. The precursor particles in the emulsion obtained by these polymerization methods have a diameter usually in the range of 5 nm to 100 µm, and can be obtained as an aggregate of the particles with a very narrow particle size distribution.

The precursor spherical particles may contain either a liquid phase carbonizable material or a pyrolitic decomposable polymer, but preferably contain both of them. These particles may also contain a material or materials other than the liquid phase carbonizable materials and pyrolitic decomposable polymers provided that such additional materials don't greatly affect the excellent properties of the carbon particles of the present invention.

In case where the precursor spherical particles contain both of a liquid phase carbonizable material and a pyrolitic decomposable polymer, it is conjectured that the pyrolitic decomposable polymer functions to facilitate plastic deformation of the liquid phase carbonizable material in the heating step for carbonizing the precursor spherical particles, and further, it is heat decomposed in a high temperature region to become a gas which, by its pressure, expands the precursor particles from the inside to promote formation of the hollow particles. It is also considered that the precursor spherical particles expanded by the gas pressure are pressed against the wall of the heat-resistant material, to be described later, coated on the outer surface of each particle, whereupon carbonization is let advance and crystallization is accelerated.

For incorporating a pyrolitic decomposable polymer in the precursor spherical particles, there are available, for example, a method in which the component monomers are copolymerized in the appropriate compositional ratios, and a seed polymerization method for having the composition unevenly distributed.

The production method of the present invention is characterized in that the said precursor particles are used as base material, and these particles are carbonized in a state of being covered with a its prototype mold so as to maintain their shape. In a preferred embodiment of the present invention, the particles are coated with a heat-resistant material to make it possible to obtain the spherical carbon particles having substantially the same shape and size as the its prototype mold of the base material.

It is necessary to keep the precursor particles from being affected in shape by thermal deformation or other changes of the heat-resistant material at a temperature below the temperature region where the precursor particles are carbonized. A preferred heat-resistant material is one whose linear thermal shrinkage in the temperature region of 50 to 500° C. is not more than 30%, and which has no definite glass transition temperature (Tg) in the temperature range of 100 to 500° C. It is also preferable to use a material which can be removed by a simple method after carbonization by heating.

Generally, inorganic oxides are preferably used as the heat-resistant material which meets the said property requirements. Typical examples of such inorganic oxides are $SiO_2$, $Al_2O_3$, $TiO_2$, $ZrO_2$, $In_2O$, $ZnO$, $PbO$, $Y_2O_3$, $BaO$ and mixtures thereof. Of these compounds, $SiO_2$, $Al_2O_3$, $TiO_2$ and $ZrO_2$ are preferred in view of purity of the obtained spherical carbon particles and control of metallic impurities. $SiO_2$ is the most preferred as it is conducive to stable progress of the carbonization reaction and crystallization of the precursor particles.

As the inclosing (coating) methods of the precursor particles, there are available, for example, a method comprising a sol-gel process using metal alkoxide or the like of the said inorganic oxides as base material, and a method using a solution of a solvent-soluble inorganic compound such as nitrates or oxychloride salts for coating.

It is also possible to use a method in which a silica sol is mixed with the precursor polymer particles in a solvent such as alcohol, then dried and deposited on the precursor particle surfaces. In the coating method comprising a sol-gel process mentioned above, sodium silicate (water glass) can be cited as a material meeting the said property requirements other than metal alkoxide.

Particularly, the method comprising coating the precursor particles with a sol solution obtained from hydrolysis of metal alcoxide, or the method comprising dispersing the precursor particles in the hydrolyzate solution and then drying them to gelate or solidify the peripheries of the precursor particles are preferred for enabling stabilized control of the gel homogenizing step.

The following method can be illustrated as a typical example of the coating methods using $SiO_2$. First, an alkoxysilane is added to a solution of an alcohol such as methanol or ethanol, to which water is added and the mixture is stirred at room temperature for several hours for carrying out hydrolysis to prepare a silicate sol solution. In preparation of this sol solution, usually the solution is adjusted to an appropriate pH for controlling sol stability and reactivity. In the above reaction, oxalic acid, acetic acid, hydrochloric acid, sulfuric acid, ammonia or the like may be added as a catalyst.

In case of using sodium silicate, there are available the methods beside the above-mentioned method in which a sol is prepared from a metal alkoxide, for example, a method in which water is added to an alcohol solution of sodium silicate and the mixture is stirred with an ion exchange resin for carrying out a sodium-hydrogen exchange reaction to thereby prepare a sol solution.

It is also possible to use a method in which the precursor particles are mixed in a sol solution and the mixture is allowed to stand at a temperature in the range from room temperature to 100° C., preferably from room temperature to 80° C., for several hours to several days until the solution is gelled to thereby obtain a silica gel having the precursor particles dispersed therein. In addition to these methods, a method is also usable in which a silicate sol solution is spray coated on the precursor particles.

Examples of the said alkoxysilanes usable in the present invention include tetraalkoxysilanes such as tetramethoxysilane, tetraethoxysilane, tetraisopropoxysilane, tetrabutoxysilane and their oligomers, and alkyltrialkoxysilanes such as methyltrimethoxysilane, methyltriethoxysilane, ethyltrimethoxysilane and ethyltriethoxysilane. Two or more types of these alkoxysilanes may be used simultaneously depending on the gelation process conditions and dispersibility of the precursor particles when coated.

In the said $SiO_2$ coating, increasing the density of siloxane bonds in $SiO_2$ by vacuum drying the $SiO_2$ coated precursor particles or by heating them within limits not causing thermal deformation is conducive to enhancing heat resistance of the coating.

Figure 1:
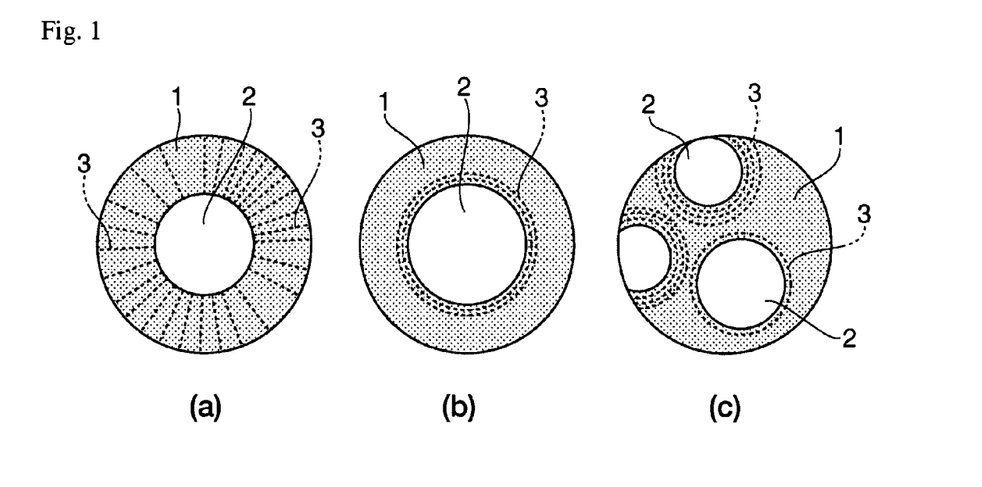
FIG. 1 is schematic illustrations of the carbon particles differing in direction of carbon crystal.

According to the present invention, it is possible to make the carbon particles differing in the direction of carbon crystal orientation or having plural voids by varying the polymer composition or the silicate sol gelling conditions, as shown in FIG. 1 (a)-(c). In the following, the methods of producing the carbon particles of various structures will be explained. In FIG. 1 (a)-(c), reference numeral 1 indicates carbon crystal wall, 2 void, and 3 direction of carbon crystal orientation (laminated direction of carbon net plane).

<Method of Producing the Carbon Particles Having the Structure Shown in FIG. 1(a)>

A characteristic feature of these carbon particles is that they have a structure in which the crystals are laminated in the direction substantially parallel to the tangent line, with the carbon crystal ends being accordingly exposed to the outer periphery, or have a structure in which the carbon net plane is looped at the outer periphery. A method of producing these carbon particles is shown below.

The precursor particles are mixed in the said sol solution and the mixture is dried usually at a temperature not higher than 100° C. in an open system to cause gelation to obtain a silica gel having the precursor particles dispersed therein. The drying time is usually not less than several minutes, preferably not less than 30 minutes, but usually not more than several hours, preferably not more than 60 minutes. A too long drying time tends to impede control of the crystal end direction in the carbon particle surface. The precursor particle-dispersed silica gel made through the above process have the pores of a size suited for moderately releasing the generated gas. Further, since there exist many residual hydroxyl groups, the silica surface directly contacted with the carbon precursor formed by thermal decomposition of a polymer becomes hydrophilic, so that the carbon precursor formed by thermal decomposition of a polymer can be easily oriented at its edges in the direction of the silica surface, and consequently, as it is supposed, the particles have a structure in which the carbon crystal ends are exposed to the outer periphery, or a structure in which the carbon net plane is looped is provided at the outer periphery.

<Method of Producing the Carbon Particles Having the Structure Shown in FIG. 1(b)>

These carbon particles are characterized in that the crystals are laminated in the radial direction, and that they have no structure in which the carbon crystal ends are exposed to the outer periphery nor a structure in which the carbon net plane is looped at the outer periphery. A method of producing these carbon particles is described below.

A method achieving gelation by a long-time reaction is advantageous for lessening the influence of the covering its prototype mold surface on the crystal orientation of the residual functional groups in the carbonization process. In this case, the drying time of the silica sol derived from a silicate is usually not less than 24 hours, preferably not less than 48 hours in the closed system. The coated precursor particles may be subjected to a stabilization treatment prior to the carbonization step with the object of controlling orientation of the carbon crystals. That is, it is advantageous to apply a stabilization treatment for the purpose of providing a structure in which the crystals are laminated in the radial direction while avoiding the structure in which the carbon crystals have their edges directed to the surface or having a looped structure in the surface. Here, "stabilization" means to increase fluid viscosity by a polymerization reaction such as an intermolecular crosslinking reaction before carbonization. The stabilization treatment is generally carried out by heating in the air or an oxygen atmosphere under normal pressure at a temperature in the range of 150 to 280° C., preferably 180 to 240° C., for a period in the range of one to 72 hours, preferably one to 24 hours. It is considered that this stabilization treatment serves for minimizing the influence of the surface structure on the coating material by elevating the fluid viscosity in the course of liquid phase carbonization of the precursor particles, allowing formation of the carbon crystals of a structure in which the crystals are laminated in the radial direction.

<Method of Producing the Carbon Particles of the Structure Shown in FIG. 1(c)>

A salient feature of these carbon particles is that they are the spherical particles each having a void or voids enclosed by the carbon crystal wall, in which part of the carbon crystal wall is missing and, regarding the configuration, the inside void is in communication with the outside. A method of producing these carbon particles is illustrated below.

In the method of producing the carbon particles of the structure shown in FIG. 1(b), a stabilization treatment is conducted on the precursor particles to further raise fluid viscosity during liquid phase carbonization. To be specific, the conditions for the stabilization treatment are properly varied. For instance, temperature, time and oxygen concentration in the atmosphere mentioned above are elevated or elongated, or the content of the component easy to conduct intermolecular crosslinking (such as acrylonitrile) is increased as the precursor particle material. The reason why the carbon particles of the structure shown in FIG. 1(c) can be obtained by applying the above-said conditions appears accountable as follows. That is, regarding the decomposed gas in the above surmised mechanism, the individual air cells are controlled from merging together, and it is surmised that the said gas exists in the form of plural air cells as small units, i.e. in the form of relatively small hollow or void, rather than forming a large air cell in each particle and expanding in the carbonization process. The air cell formed close to the precursor particle surface constitutes a void at the interface formed with silica after carbonization. Thus, increase of fluid viscosity facilitates formation of the void having a through portion communicated with the outside.

Carbonization of the precursor particles is now explained. Carbonization of the precursor particles is carried out by heating the precursor particles coated with the said its prototype mold in an atmosphere free from any material which may react with the precursor particles during heating, such as nitrogen or argon. The atmosphere in heating may be either a flow system or a closed system, though the flow system is preferred. This heating operation may be conducted either under pressure or under reduced pressure, but usually it is performed under normal pressure. In the latter case, the heating temperature is usually not lower than 500° C., preferably not lower than 800° C. Heating may be conducted by elevating the temperature either successively or stepwise till reaching the specified temperature. The heating time, although variable depending on the heating temperature, is usually 0.5 to 2 hours after reaching the specified temperature.

After carbonization, usually the its prototype mold on the particle surface is removed. For removing the its prototype mold, methods are available such as dissolving it with an alkaline solution such as sodium hydroxide or fluoric acid, but dissolving with an alkaline solution is preferred for industrial safety. This removal by dissolving is usually conducted by heating the its prototype mold to 150° C. to dissolve it in a pressure-resistant closed vessel and recovering the remaining spherical carbon particles after solid/liquid separation. In case of using polyacrylonitrile or a copolymer containing polyacrylonitrile as the precursor, the yield of the spherical carbon particles obtained by the above method is usually not less than 30% by weight, in most cases in the range of 35 to 40% by weight.

According to the production method of the present invention, it is possible to obtain the spherical carbon particles as a mass of particles with a uniform size and shape, and further, as another advantage to the method of the present invention, the spherical carbon particles of the final product can be designed at the stage of precursor. Thus, according to the method of the present invention, there can be obtained, from the precursor spherical particles with diameters of 5 nm to 100 µm, the objective spherical carbon particles of the substantially same diameters (5 nm to 100 µm) as the precursor particles.

The method of the present invention is also useful for obtaining the carbon particles with high crystallinity. Particularly in case where the precursor material is one which is capable of liquid phase carbonization, the product of the liquid phase carbonization step in the method of the present invention greatly affects the crystal structure of the post-carbonization product, but the surface properties of the its prototype mold covering the particle surfaces exert a large influence to crystallinity of the final product. In case where a polymer capable of liquid phase carbonization such as polyacrylonitrile is used as the precursor, there is derived a large influence on crystallinity and orientation as the effect of the surface functional groups of the its prototype mold to the carbon radicals produced in the process of carbonization. Examples of the surface functional groups are silanol groups, hydroxyl groups, ketone groups and ester groups.

By virtue of the said advantageous effects of the method of the present invention, the spherical carbon particles obtained by the method of the present invention have a novel structure which has never been seen in the conventional particles as explained below.

Here, the spherical carbon particles of the present invention are described.

The spherical carbon particles of the present invention fall in the range of 5 nm to 100 µm in size. The "particle size" designates the diameter of the particle when its aspect ratio is 1 and the major diameter of the particle when its aspect ratio exceeds 1. The "spherical" particle usually refers to a particle whose aspect ratio is less than 2.

The spherical carbon particles of the present invention are preferably confined in a specified range in radial ratio. When the radial ratio is more than 1.3, fluid viscosity becomes too high when the particles are used as a slurry, which tends to give rise to the problems such as excessively high discharge pressure when the slurry is used as an ink jet pigment.

The carbon content of the spherical carbon particles of the present invention may not necessarily be 100% by weight, but in view of chemical stability, it is usually not less than 70% by weight, preferably not less than 75% by weight, as determined by elemental analysis.

The spherical carbon particles of the present invention are usually crystalline. "Crystalline", referred to herein does not necessarily mean the so-called graphite-like controlled crystal state; it also embraces the crystal state of turbostratic structure graphite such as shown in Koyama et al: "Kogyo Zairyo" (Industrial Materials), Vol. 30, No. 7, pp. 109-115. The crystallographical properties of the particles as determined from the reflection peaks of X-ray diffraction as a measure of crystallinity are as follows. The X-ray diffraction pattern of the particles shows peaks when the angle of diffraction $2\theta$ of X-ray using $CuK^\alpha$ as output source is not less than 25° (preferably not less than 25.5°), and the half bandwidth of the peak is not greater than 7.0° (preferably not greater than 6.5°, more preferably not greater than 5.0°). Also, the average interplanar distance $d_{(002)}$ of the carbon network calculated from the angle of diffraction at (002) peak according to the Bragg's formula is not greater than 3.6 Å (preferably not greater than 3.49 Å).

Another important feature of the spherical carbon particles of the present invention is that they have a void or voids enclosed by the carbon crystal wall. Crystals are observed at least in the neighborhood of the particle surface or at a wall portion close to the void. The laminated direction of crystals can be determined by the contrast of an electronic image taken by TEM of 800,000 or greater magnifications.

The expression "enclosed by the carbon crystal wall" used in the present invention means, in its narrow sense, that there exist no air spaces with a diameter greater than a certain value which are communicated with the hollow (void). More specifically, the expression suggests that when the particles are observed by TEM photographs, there should exist no air spaces with a diameter usually not smaller than several ten nm, preferably not smaller than several nm, more preferably not smaller than 1 nm. Whether the particles are hollow or not can be confirmed by the contrast in the TEM observation image. In case where the object shows the same contrast as hollow body like water, the object is considered as being hollow. The laminated direction of the carbon crystal face can be confirmed by the contrast in the TEM observation image of 800,000 or greater magnifications.

On the other hand, the above-mentioned expression "enclosed by the carbon crystal wall" signifies, in its broader sense, a conception which not only represents the particle structure having an inside void (hollow) of the perfect form not communicated with the outside as shown in FIGS. 1 (a) and (b), but also designates the structure in which part of the carbon crystal wall is missing and the inside spaces are communicated with the outside as shown in FIG. 1(c). Therefore, in the present specification of the invention, "hollow" is a species or lower conception of "space".

The "void enclosed by the carbon crystal wall" in the spherical carbon particles of the present invention may be single or plural (a structure in which a void enclosed by the carbon crystal wall is formed and this void is further divided into plural voids by the carbon crystal walls), but only one void is preferred. The major diameter of at least one void is usually not less than 5%, preferably not less than 10%, more preferably not less than 30% of the diameter of the spherical carbon particle. This void may be further divided into plural sections by the amorphous carbon walls. It is not always that air exists in the void (or hollow) in the spherical carbon particles of the present invention; such a void may be filled with a liquid or a solid though it is essential that the void is not filled up entirely with carbon.

The thickness of the carbon crystal wall, when expressed as the ratio of the distance (radius) from the center of the particle to the outer periphery of the wall, is usually not more than 0.5, preferably not more than 0.3, in view of the effect of stabilizing dispersion by low specific gravity when dispersed into a liquid medium and the carriage capacity in case of using the filler as a carrier for supporting other substance in the void.

Figure 2:
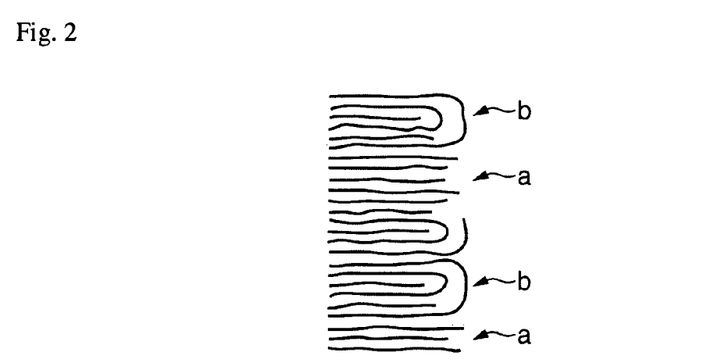
FIG. 2 is a schematic illustration showing a structure where the carbon crystal ends are exposed or the carbon net plane is looped.

The spherical carbon particles in one embodiment of the present invention are characterized in that they have a structure with the carbon crystal ends exposed or a structure in which the carbon net plane is looped at least at part of the outer periphery of the particle. FIG. 2 is a schematic illustration of the carbon crystal end exposed structure and the carbon netplane looped structure at the outer periphery of the spherical carbon particles of the present invention. More specifically, FIG. 2 is an illustration showing enlarged a partial section of the outer peripheral surface of the particle (in FIG. 2, the left side corresponds to the inside of the particle and the right side corresponds to the outside of the particle), with the carbon crystal direction being schematically shown by the curved lines. The structure with the particle surface side ends of the carbon net plane being not closed, indicated by letter "a" in FIG. 2, corresponds to the structure where the ends of the carbon crystal are exposed at the particle surface (hereinafter referred to simply as "crystal end exposed structure"), and the structure in which the particle surface side ends of the carbon net plane are joined together, indicated by letter "b" in FIG. 2, corresponds to the structure in which the carbon net plane is looped at the particle surface (hereinafter referred to simply as "looped structure"). The looped structure is usually composed by up to 20 laminations of the carbon net plane. The surface configuration (crystal end exposed structure and looped structure) of the particles can be confirmed by TEM photographs of 800,000 magnifications.

In the spherical carbon particles of the present invention, it is merely required that these crystal end exposed structure and looped structure exist at least at a part of the outer periphery of each particle. To be specific, these crystal end exposed structure and looped structure combined occupy usually not less than 10%, preferably not less than 20%, more preferably not less than 30% of the whole outer peripheral surface area of the particle. It is acknowledged in the carbon fiber industry that generally, when the crystal end exposed structure is heated, the atoms and other matters adhering to the crystal ends are eliminated to form a loop.

The spherical carbon particles according to another embodiment of the present invention are characterized in that when they are massed into an aggregate, the ratio of the particles having a radial ratio of 1.0 to 1.3 is not less than 40% by number. Here, the "radial ratio" is the value given by dividing the largest radius by the smallest radius, and with reference to the "length from the center of gravity to the outer periphery" measured by TEM observation, the greatest length is taken as expressing the greatest radius and the smallest length is taken as expressing the smallest radius. TEM observation is conducted in the following way. First, several tens of the particles are observed with a low magnification, and from these particles are selected 10 pieces which are supposed to have an average diameter. They are then observed with a high magnification capable of confirming the radial ratio (e.g. 800,000 magnifications when the particle diameter is several hundred nm) and subjected to image processing, and then "length from the center of gravity to the outer periphery" is measured. In the present invention, the ratio of the spherical carbon particles having a radial ratio of 1.0 to 1.3 is preferably not less than 50% by number, more preferably not less than 60% by number, even more preferably not less than 70% by number, especially preferably not less than 80% by number.

The spherical carbon particles of the present invention, because of the spherical form, are low in viscosity of their solution in comparison with the particles of other forms such as fibrous, so that when these carbon particles are used as a pigment, it is expected that their dispersion would be capable of easy and homogeneous coating. Also, when the dispersion is used an ink for ink jet printers, it is considered that there can be obtained the advantageous effects of easy discharge and little probability of clogging.

Further, in the case of the spherical carbon particles having the carbon crystal end exposed structure or the carbon netplane looped structure at the outer periphery of the particles, it is considered easy to intercalate other atoms between the carbon crystal layers or to effect their field emission as compared with the particles in which the carbon crystal orientation is concentric, so that application of these particles to the field emission displays or to the production of lithium cells by adding Li to the particles are expected. As for the electron emission of CNT (carbon nano-tube), it is known that the field emission takes place preferentially from the 5-member rings (R. Saito et al: "Foundation and Application of Carbon Nanotubes", pp. 159-169, 2004, BAIFUKAN CO., LTD). Also, as these particles develop high surface energy at the crystal end portions, it is supposed that they have strong affinity for other substances, and hence their effective utilization as an adsorbent of specific substances or gases or as a catalyst carrier in the certain derives such as fuel cells is expected.

In addition, the spherical carbon particles of the present invention have good electroconductive properties arising from crystallinity and are uniform in shape, so that they have the advantage of being easy to handle. Further, these spherical carbon particles may be provided with good dispersibility not possessed by the conventional carbon materials, particular the properties of being dispersed in water and polar solvents to a high degree. Therefore, the spherical carbon particles of the present invention, by taking advantage of the said properties, can be used as a composite material for the purpose of affording conductivity to various types of polymers, in addition, by taking advantage of the above good dispersibility, they can find various applications as a coating solution for forming an antistatic layer. Particularly, because of their minute size and uniformity, they are useful as a conductive filler for the transparent conductive films used for glass substrates, PET films, PVA films, etc., which have high surface energy. Further, these particles have a void and this means that they have a capsule structure. By taking advantage of such structural feature, they can find useful applications in the field of support material for in vivo diagnostic and monitoring reagents.

The surface properties of the spherical carbon particles of the present invention can be controlled by the surface properties of the its prototype mold in the course of production or the after-treatment on the product. Particularly in case of using $SiO_2$ for the its prototype mold, improvement of dispersibility is anticipated. This is considered attributable to the presence of hydroxyl groups or carbonyl groups in the spherical carbon particle surface.

The hollow carbon particles having a crystal structure like Hyper-Fullerene are non-uniform in size and shape, so that these particles have the problems such as bad dispersibility in solvents. Also, the hollow carbon particles uniform in size and shape, produced by a its prototype mold method, do not posses a crystal structure but have an amorphous structure and are therefore poor in electrical properties such as conductivity and field emissivity. The spherical carbon particles of the present invention, on the other hand, are characterized in that they posses a void or voids enclosed by the carbon crystal wall, are uniform in size and shape and also show high dispersiblity in solvents. Thus, the spherical carbon particles of the present invention are different from the conventional spherical carbon particles.

The carbon particles obtained by the method of the present invention have the atoms derived from the precursor material such as oxygen and nitrogen atoms in the surface while possessing a carbon crystal structure by selecting the type of the precursor material used. These atoms exist as functional groups in the particle surface and function to enhance affinity for the solvents. The oxygen and nitrogen atoms contained in the carbon particles can be determined an ordinary elemental analysis for C, H and N. For allowing these atoms to function as anticipated, the content of the nitrogen atoms is usually 1.0 to 12% by weight, preferably 2.0 to 10% by weight while the content of the oxygen atoms is usually 1.0 to 15% by weight, preferably 3.0 to 9% by weight. The functional groups present in the carbon particle surface can be assigned by a proper method such as infrared absorption spectrum or X-ray photoelectron spectroscopy (XPS).

Next, the aggregates of the spherical carbon particles according to the present invention are explained.

The aggregates of the spherical carbon particles of the present invention are characterized in that the particle diameter distribution index represented by the following formula (I) as determined with a dispersion prepared in the manner described below after allowing the dispersion to stand for 24 hours after its preparation is 0.1 to 20. In the preferred embodiments of the present invention, the aggregates of the spherical carbon particles comprise the above-described spherical carbon particles.

<Preparation of the Dispersion>

3 ml of a dispersant and 1 mg of a test sample are put into a vial having an inner diameter of 13 mm and a capacity of 5 ml, and after fixing the cover in position, the vial is shaken by an ultrasonic shaker for one minute under the conditions of 120 W high-frequency output and 38 kHz oscillating frequency to have the sample dispersed.

Particle diameter distribution index=[(diameter of 90 vol % of the particles counted from the smallest diameter)−(diameter of 10 vol % of the particles counted from the smallest diameter)]/(diameter of 50 vol % of the particles counted from the smallest diameter) <Formula (I)>

Regarding the dispersant used for the preparation of the said dispersion, it is necessary to select a proper dispersant inert to the spherical carbon particles in consideration of the surface properties of the spherical carbon particles to be obtained and other matters. In the present invention, selection of the dispersant is made in the following way. A dispersion is prepared in the same way as in the preparation of the above-mentioned dispersion, and after allowing the dispersion to stand for 24 hours after preparation, the dispersion in the middle portion between the position of 1 cm from top of the dispersion and the position of 1 cm from its bottom end is visually observed. The dispersant obtained in a uniformly dispersed state with substantially no secondary cohering particles present is selected. The dispersants that can meet the above requirements include those mentioned below, but in the case of the spherical carbon particles of the present invention, water can be used as an appropriate dispersant.

The particle diameter distribution index can be determined by a dynamic light scattering method using a particle diameter distribution meter. The index needs to fall in the range of 0.1 to 20, preferably 0.3 to 10. In judging the numerical value of the particle diameter distribution index, it should be noted that even if the supernatant portion satisfies the formula (I) after standing, there can still exist a sediment, so that the aggregates of the spherical carbon particles which seemingly satisfy the formula (I) are not included in the scope of the present invention.

The aggregates of the spherical carbon particles of the present invention usually are free from cohesion like observed in the aggregates of carbon black as well as secondary cohesion (physical cohesion). Such properties contribute to the improvement of dispersibility and explicitly distinguish the product of the present invention from physically cohesive carbon black.

The "carbon particle" referred in the present invention corresponds to the primary particle referred to in connection to carbon black, and the "aggregate" does not signify the "structure" referred to in connection to carbon black but designates a state in which the plural primary particles exist independently of each other.

For the preparation of the said dispersion, it is possible to use a more simple method without using an ultrasonic shaker. That is, because of good dispersibility of the carbon particles of the present invention in the solvents, by simply shaking the sample sufficiently with hands, it is possible to obtain the particle size distribution index of a value equal to that obtained when using an ultrasonic shaker.

Next, the dispersion of the spherical carbon particles according to the present invention is explained. The dispersion of the present invention is characterized in that the said spherical carbon particles or their aggregates are dispersed in a dispersant.

The dispersant is not specified in the present invention, and it is possible to use both polar and non-polar solvents. Examples of the polar solvents usable in the present invention include, besides water, alcohols such as methanol, ethanol and isopropyl alcohol, glycols such as ethylene glycol and propylene glycol, ethers such as tetrahydrofuran and diethyl ether, monoalkyl ethers of glycols such as ethylene glycol monoethyl ether, ethylene glycol monomethyl ether and propylene glycol monomethyl ether, ketones such as acetone and methylethyl ketone, esters such as ethyl acetate, and carbonates such as ethylene carbonate and propylene carbonate. The non-polar solvents include various types of alkanes, aromatics and mixtures thereof. The polar solvents are preferred because of high affinity and good dispersibility, with water and alcohols being especially preferred.

It is possible to obtain a highly dispersed composite by adding, in addition to the spherical carbon particles, a material(s) highly dispersible in dispersants, such as water-soluble resins, organic soluble resins, cement, silicates, ceramics or the like, and then removing the dispersant.

The ratio of the spherical carbon particles in the dispersant is usually 0.1 to 10% by weight. Various means such as mechanical stirring, mechanical shaking by a paint shaker or such, application of ultrasonic waves, etc., can be used for dispersing the spherical carbon particles in the dispersant. A surfactant may be used as required.

In the case of the carbon particles which have been improved in dispersibility by surface modification or by incorporation of a surfactant or a polymeric modifier, the particle size distribution index is determined by using their sample with the said modification treatments retained.

The dispersion of the present invention has the following advantageous features. Since the particles are uniform in size, the sedimentation rate of the particles in the dispersing medium is constant, and it is possible to obtain a homogeneous suspension which remains stable with time. Also, in case where the dispersant is a polar solvent and hydrophilic groups are present in the spherical carbon particle surface, the particles can be even better dispersed and the flocculates of the particles are scarcely formed.

The dispersed particle diameter in the dispersion of the present invention can be measured by a dynamic light scattering method using a particle size distribution meter or a laser diffraction scattering method. More specifically, the particles are dispersed in a dispersant in the above-described way and the dispersion is allowed to stand for 24 hours before conducting the measurement. Here, the "dispersed particle diameter" is the average diameter of the particles cleared of the particles or flocculates with a size of 200 µm or more, which is the size above the measuring range. The particles of 200 µm or more are generally outside the scope of the measuring capability no matter which of the dynamic light scattering method and the laser diffraction method is used, and the presence of such particles can be confirmed by optical microscopy.

In the dispersion of the present invention, it is usually preferable that when 100 or more pieces of particle are observed, 90 vol % or more of the whole measured particles are those with a diameter or aggregate size of not more than 60 µm, more preferably not more than 30 µm.

EXAMPLES

The present invention is further illustrated by the following examples, but it is to be understood that the present invention is not limited to these examples but can be embodied otherwise as well without departing from the scope and spirit of the invention.

Example 1

First, the core/shell particles were synthesized in the following way. 31.66 g of methylmethacrylate and 1.32 g of methacrylic acid were mixed with 345 g of water, and the mixture was heated from room temperature with stirring at 300 rpm in a stream of nitrogen gas. On reaching 75° C., a potassium persulfate solution (prepared by dissolving 0.1 g of potassium persulfate in 5 g of water) was added to start polymerization, which was carried on for 3 hours at 75° C. Conversion was 92%. To 46.9 g of this dispersion of core particles, 1.0 g of LATEMUL AD-25 (produced by Kao Corporation), 0.16 g of potassium persulfate and 153 g of water were mixed and the mixture was heated from room temperature with stirring at 300 rmp in a stream of nitrogen gas. On reaching 70° C., dropwise addition of a mixed solution of 6.1 g of acrylonitrile, 1.10 g of methylacrylate and 0.22 g of n-octylcaptan was started, with this dropwise addition being finished in one hour and 15 minutes. Thereafter, polymerization was further carried out for 5 hours. The resulting dispersion was centrifuged at 18,000 rpm, then the supernatant solution was removed and the precipitated core/shell particles were washed thrice in the same way to obtain a core/shell particle dispersion with a solid ratio of 12.8%. 60,000-magnification SEM observation confirmed the particles were the spherical particles with a diameter of 425 to 438 nm.

In the meantime, 5.26 g of a methyl silicate oligomer (MS51 produced by Mitsubishi Chemical Corporation) was mixed and dispersed in a mixed solution of 3.64 g of water and 4.65 g of ethanol, to which 1 mol/L hydrochloric acid was mixed to prepare a solution with pH 4. The mixture was stirred at room temperature for one hour to hydrolyze the methyl silicate oligomer to prepare a silica sol as a homogeneous solution.

1.85 g of this silica sol was added to 0.62 g of an emulsion of the said core/shell particles (the amount of polymer particles: 0.079 g), and after mixing by shaking, the vessel was stoppered and left for 3 days to obtain a gel with no fluidity, thereby preparing a silica gel containing the polymer particles. This gel was transferred to a glass dish and dried in vacuo at room temperature for 10 hours.

The dried gel was heated in an electric furnace from room temperature at 5° C./min till reaching 1,000° C. in a flow system of nitrogen atmosphere under normal pressure and maintained at 1,000° C. for one hour to carbonize the polymer particles. Then heating was stopped and the sample was taken out after 12 hours in which the electric furnace was cooled down to room temperature. This sample was mixed in 60 ml of a 1 mol/L sodium hydroxide solution, put into a pressure vessel and heated at 170° C. in an oven for 6 hours to dissolve the silica gel, thus preparing a dispersion having the carbon particles dispersed therein. This dispersion was centrifuged at 18,000 rpm, the supernatant solution was removed and the precipitated carbonized particles were washed with water thrice in the same way to obtain a dispersion of carbon particles.

This dispersion was dispersed ultrasonically for 3 minutes, and 3 droplets of the dispersion, collected at random, were placed on a slide and observed under an optical microscope (×100 magnification). In any of the droplets were found no carbon particles and their flocculates with a size of 100 µm or more.

Figure 3:
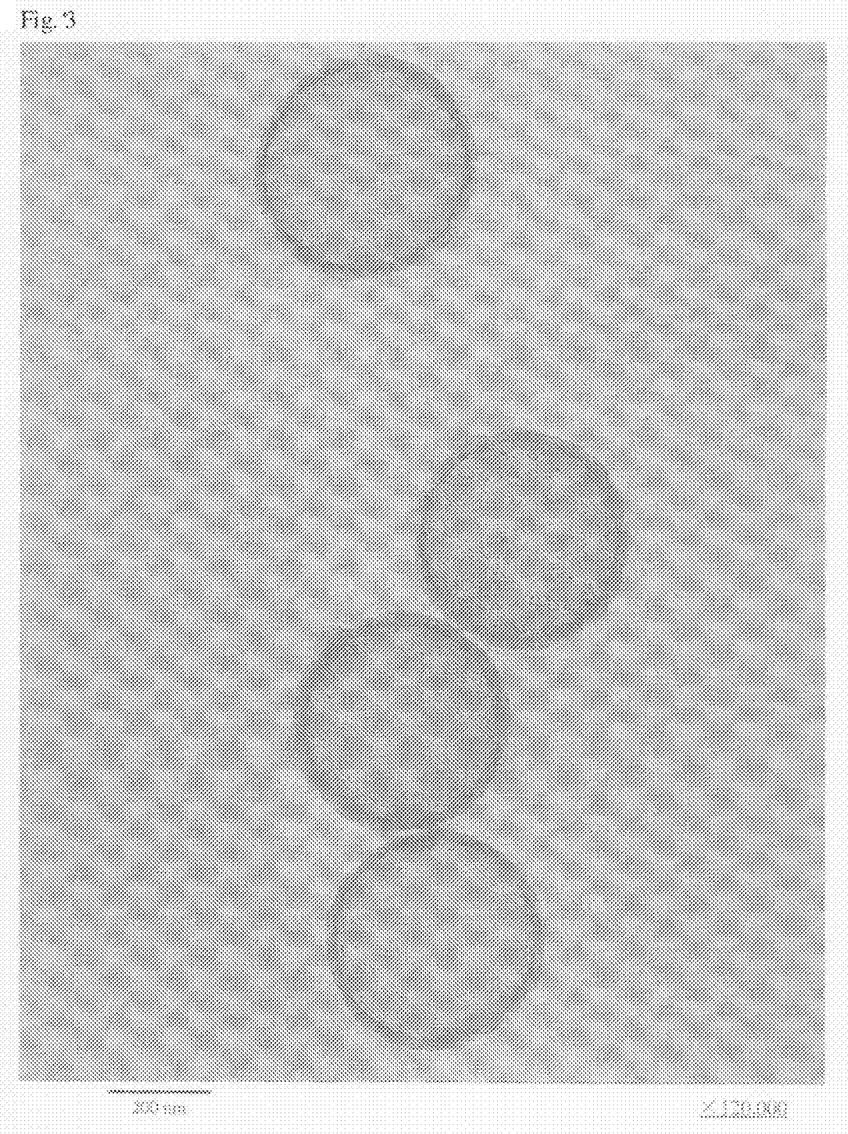
FIG. 3 is an illustration of the spherical carbon particles obtained in Example 3.

TEM (×120,000 magnification) observation of the structure of the particles in the said dispersion confirmed that these particles were the spherical particles of 410 to 420 nm in diameter (see FIG. 3). The wall thickness was 25 nm, and each particle had one void enclosed by the carbon crystal wall. Also, there were noted no cohesion of particles in the aggregate of these spherical carbon particles. The ratio of the crystal wall thickness to the particle radius was 12.0%, indicating a sufficiently large volume of void in the particle.

Measurement of the dispersed state of the particles in water by a dynamic light scattering type particle size distribution meter (Microsoft USA Model 930-USA, Honeywell) showed that the particles had a monodisperse diameter distribution with a 50% volume distribution diameter of 515 nm, a 10% volume distribution diameter of 363 nm, a 90% volume distribution diameter of 667 nm and a diameter distribution index of 0.59. Further, 10 average particles were selected and subjected to image processing and their radial ratios were calculated, finding that these 10 particles had the radial ratios of 1.04, 1.06, 1.07, 1.07, 1.07, 1.07, 1.07, 1.07, 1.08 and 1.09, respectively. Thus, the ratio of the spherical carbon particles having a radial ratio in the range of 1.0 to 1.3 was 100% by number.

An analysis of the peak which appeared at $2\theta=25.7°$ in XRD measurement of crystallinity of the particles showed that the half bandwidth of the peak was 4.30° and the interplanar distance of crystallites was 3.46 Å. The result of an elemental analysis showed that the main component elements of the particles were carbon, nitrogen and oxygen with their detected concentrations being 79.50% by weight, 6.27% by weight and 13.45% by weight, respectively. As for other components, hydrogen was not more than 0.78% by weight and silicon was not more than 1% by weight, which are below the limit of detection.

There was also conducted an analysis of the surface functional groups of the carbon particles of the instant embodiment by X-ray photoelectron spectroscopy, confirming the peaks of C—OH, C═O and COOR (R: alkyl group) from peak separation. Further, in determination by Fourier transform infrared spectroscopy (using the diffuse reflection method), OH stretching vibration was observed at around 3,400 cm$^{-1}$, confirming the presence of OH groups.

Example 2

First, fine particles of an acrylonitrile and methyl acrylate copolymer were synthesized in the following way. 0.32 g of sodium dodecylsulfate was dissolved in 145 g of water, to which a mixture of 12.71 g of acrylonitrile, 1.83 g of methyl acrylate, 0.46 g of methacrylic acid and 0.3 g of n-butylmercaptan was added and the mixture was heated from room temperature with stirring at 300 rpm in a stream of nitrogen gas. On reaching 60° C., a potassium persulfate solution (prepared by dissolving 0.1 g of potassium persulfate in 5 g of water) was added to start polymerization, which was carried on at 70° C. for 3 hours. After termination of the reaction, water was removed to prepare a suspension containing 12.5 g of acrylic resin particles having an average diameter of 130 nm (measured by the above-mentioned dynamic light scattering type particle size distribution meter). The ratio of the acrylonitrile units calculated from the quantity of nitrogen determined by an elemental analysis (for C, H and N) of the resin particles was 79.5% by weight, and the polystyrene (PSt)-reduced weight-average molecular weight based on size-exclusion chromatography (SEC) was $4.1 \times 10^4$. The obtained acryl particles were confirmed to be the spherical particles with diameters of 115 to 148 nm from observation by ×60.000 magnification SEM.

In the meantime, 5.59 g of a methyl silicate oligomer (MS51 produced by Mitsubishi Chemical Corporation) was mixed and dispersed in a mixed solution of 3.87 g of water and 4.94 g of ethanol, to which 1 mol/L hydrochloric acid was added to prepare a pH 2 solution. This solution was stirred at 50° C. for one hour to hydrolyze the methyl silicate oligomer to prepare a silica sol as a homogeneous solution.

1.58 g of this silica sol was added to 0.52 g of an emulsion of the said acryl particles (amount of polymer particles: 0.043 g), and after mixing by shaking, the mixture was supplied to an 8 cm-diameter Petri dish made of Teflon (registered trade name) and heated on a 40° C. hot plate for 5 hours for drying to obtain a silica gel having the polymer particles dispersed therein. This gel was transferred to a glass dish and dried in vacuo at room temperature for 10 hours.

The dried gel was heated in an electric furnace from room temperature at a rate of 5° C./min to 1,000° C. in a flow system of nitrogen atmosphere under normal pressure and maintained at 1,000° C. for one hour to carbonize the polymer particles. Then heating was stopped and the sample was taken out after 12 hours in which the electric furnace was cooled down to room temperature. This sample was mixed in 30 ml of a 1 mol/L sodium hydroxide solution, put into a pressure vessel and heated at 170° C. in an oven for 6 hours to dissolve the silica gel, obtaining a dispersion having the carbonized particles dispersed therein. This dispersion was centrifuged at 18,000 rpm, the supernatant solution was removed and the precipitated carbonized particles were washed with water thrice in the similar way to obtain a dispersion of carbon particles.

The dispersion was ultrasonically dispersed for 3 minutes, and arbitrarily collected 3 droplets of the dispersion were placed on a slide and observed by an optical microscope (×100 magnification). In none of the droplets was admitted the presence of carbon particles and their flocculates having a size of 100 µm or more.

A TEM (×80,000 magnification) observation of the structure of the particles in the above dispersion confirmed that these particles were the spherical particles with a diameter of 113 to 150 nm. The wall thickness of the particles was 10 to 15 nm. The ratio of the crystal wall thickness to the radius of the particle was 19.0%, and thus the volume of the void in the particles was sufficiently large. Also, these spherical carbon particles had in the inside one void enclosed by the carbon crystal wall, and their aspect ratio was 1. There existed no flocculates in the visual field. Further, 10 average particles were sampled out and subjected to image processing and their radial ratios were calculated, finding that they had the radial ratios of 1.08, 1.11, 1.12, 1.14, 1.14, 1.17, 1.17, 1.25, 1.43 and 1.88, respectively. Thus, the ratio of the spherical carbon particles having a radial ratio in the range of 1.0 to 1.3 was 80% by number.

The state of dispersion of the particles in water was determined by a dynamic light scattering type particle size distribution meter (Microtrac USA Model 930-UPA, Honeywell) to obtain the following results: 50% volume distribution particle diameter=138 nm; 10% volume distribution particle diameter=8 nm; 90% volume distribution particle diameter=224 nm; particle diameter distribution index=1.03.

An analysis of the peak which appeared at 2θ=25.80 in XRD determination of crystallinity of the particles showed that the half bandwidth of the peak was 4.03° and the interplanar distance of the crystallites was 3.45 Å. Also, the result of an elemental analysis showed that the main component elements of the particles were carbon, nitrogen and oxygen, with their detected concentrations being 82.07% by weight, 6.37% by weight and 11.02% by weight, respectively. As for other component elements, hydrogen was not more than 0.54% by weight and silicon was not more than 1% by weight, which are below the limit of detection.

An analysis of the functional groups in the surfaces of the carbon particles of the instant embodiment was conducted by X-ray photoelectron spectroscopy, and the peaks of C—OH, C═O and COOR (R: alkyl group) were confirmed from peak separation. Also, in determination by Fourier transform infrared spectroscopy (using the diffuse reflection method), OH stretching vibration was observed at around 3,400 cm$^{-1}$, confirming the presence of OH groups.

Example 3

First, fine particles of an acrylonitrile and methyl acrylate copolymer were synthesized in the following way. 0.42 g of sodium dodecylsulfate was dissolved in 115 g of water, to which a mixture of 25.96 g of acrylonitrile, 13.76 g of methyl acrylate and 0.28 g of methacrylic acid was added, and the mixture was heated from room temperature with stirring at 300 rpm in a stream of nitrogen gas. On reaching 60° C., a potassium persulfate solution (prepared by dissolving 0.1 g of potassium persulfate in 5 g of water) was added to start polymerization, which was carried on at 70° C. for 3 hours, thereby preparing a suspension containing 10 g of acryl resin particles having an average diameter of 130 nm (measured by the above-mentioned dynamic light scattering type particle size distribution meter). The ratio of the acrylonitrile units calculated from the quantity of nitrogen determined by an elemental analysis (for C, H and N) of the resin particles was 63.5% by weight, and the polystyrene (PSt)-reduced weight-average molecular weight based on size-exclusion chromatography (SEC) was 810,000. The obtained acryl particles were confirmed to be the spherical particles with a diameter of 120 nm from observation by ×60,000 magnification SEM.

Then 1 mol/L hydrochloric acid was added to 10.41 g of water to adjust pH to 1.8, and then 13.31 g of ethanol was added. To this mixed solution was added and dispersed 15.04 g of a methyl silicate oligomer (MS51, Mitsubishi Chemical Corporation), to which 1 mol/L hydrochloric acid was further added to adjust pH to 2.0. The mixture was stirred at 50° C. for 2 hours to hydrolyze the methyl silicate oligomer, thus preparing a silica sol as a homogeneous solution.

15.77 g of this silica sol was added to 5.20 g of an emulsion of the said acryl particles (amount of polymer particles: 1.3 g), and after mixing by shaking, the mixture was supplied to a 8 cm-diameter Petri dish made of Telfon (registered trade name) and heated in a 40° C. oven in an open system for one hour for drying to form a gel, and this was further heated as it was for 19 hours for drying to obtain a silica gel having the polymer particles dispersed therein. This gel was transferred to a glass dish and dried in vacuo at room temperature for 10 hours.

The dried gel was heated in an electric furnace from room temperature at a rate of 5° C./min to 1,000° C. in a flow system of nitrogen atmosphere under normal pressure and maintained at 1,000° C. for one hour to carbonize the polymer particles. Then heating was stopped and the sample was taken out after 12 hours in which the electric furnace was cooled down to room temperature. This sample was mixed in 30 ml of a 1 mol/L sodium hydroxide solution, put into a pressure vessel and heated at 170° C. in an oven for 6 hours to dissolve the silica gel, obtaining a dispersion having the carbonized particles dispersed therein. This dispersion was centrifuged at 18,000 rpm, the supernatant solution was removed and the precipitated carbonized particles were washed with water three times in the similar way to obtain a dispersion of carbon particles.

The dispersion was ultrasonically dispersed for 3 minutes, and randomly collected 3 droplets of the dispersion were placed on a slide and observed by an optical microscope (×100 magnification). In none of the droplets was seen the presence of carbon particles and their flocculates having a size of 100 μm or greater.

The structure of the particles in the above dispersion was observed by a transmission electron microscope (TEM) (×1,300,000 magnification). From the TEM observation photographs, the particles in the dispersion obtained in this example were determined to be the spherical carbon particles having in the inside one void enclosed by the carbon crystal wall and an aspect ratio of 1. These hollow carbon particles had a structure in which the carbon crystal ends were exposed at the outer periphery. Thus these particles were confirmed to be of a structure in which the crystals were laminated in the direction substantially parallel to the tangent as illustrated in FIG. 1(a). In observation of these spherical carbon particles by ×80,000 magnification TEM, there existed no flocculates of particles in the visual field. The diameter of these spherical carbon particles was 115 to 130 nm, and the carbon crystal wall thickness was 13 to 24 nm. The ratio of the crystal wall thickness to the particle radius was 15.1%, indicating that the volume of the void in the particles was sufficiently large. Further, 10 average particles were sampled out and subjected to image processing and their radial ratios were calculated, finding that they had the radial ratios of 1.18, 1.16, 1.12, 1.08, 1.21, 1.21, 1.08, 1.05, 1.43 and 1.89, respectively. Thus, the ratio of the spherical carbon particles having a radial ratio in the range of 1.0 to 1.3 was 80% by number.

The state of dispersion of the particles in water was determined by the dynamic light scattering type particle size distribution meter (Microsoft USA Model 930-USA, Honeywell) to obtain the following results: diameter at the center of the distribution=186 nm; 10% volume distribution particle diameter=90 nm; 90% volume distribution particle diameter=286 nm; particle diameter distribution index=1.057.

An analysis of the peak which appeared at 2θ=25.80 in XRD determination of crystallinity of the particles showed that the half bandwidth of the peak was 4.25° and the interplanar distance of the crystallites was 3.45 Å. Also, the result of an elemental analysis confirmed that the main component elements of the particles were carbon, nitrogen and oxygen, with their detected concentrations being 81.10% by weight, 6.30% by weight and 12.10% by weight, respectively. As for other component elements, hydrogen was not more than 0.50% by weight and silicon was not more than 1% by weight, which are below the limit of detection.

Example 4

First, fine particles of an acrylonitrile and methyl acrylate copolymer were synthesized in the following way. 0.32 g of sodium dodecylsulfate was dissolved in 145 g of water, to which a mixture of 14.25 g of acrylonitrile, 0.6 g of methyl acrylate, 0.15 g of n-butylmercaptan and polyvinyl alcohol (PVA117, Kuraray Co., Ltd.) was added, and the mixture was heated from room temperature with stirring at 300 rpm in a stream of nitrogen gas. On reaching 60° C., a potassium persulfate solution (prepared by dissolving 0.1 g of potassium persulfate in 5 g of water) was added to start polymerization, which was carried on at 70° C. for 3 hours. After termination of the reaction, water was removed to prepare a suspension containing 10.3 g of acryl resin particles having an average diameter of 117 nm (measured by the above-mentioned dynamic light scattering type particle size distribution meter). The ratio of the acrylonitrile units calculated from the quantity of nitrogen determined by an elemental analysis (for C, H and N) of the resin particles was 94.5% by weight.

Then 12 g of a 3 wt % solution of sodium silicate and 1 g of the said acryl particle emulsion (polymer particles: 0.071 g) were mixed, to which 3 ml of a cation exchange resin (SK1B, Mitsubishi Chemical Corporation) was added, and the mixture was stirred by a stirrer to carry out ion exchange until pH became 3.0. The solution was then supplied to an 8 cm-diameter Petri dish made of Teflon (registered trade name), heated and dried on a 60° C. hot plate for 2 hours to cause gelation, and then further heated for 19 hours for drying to obtain a silica gel having the polymer particles dispersed therein. This gel was transferred to a glass dish and dried in vacuo at room temperature for 10 hours.

The thus obtained dry gel was subjected to a 16-hour stabilization reaction at 220° C., then heated in an electric furnace from room temperature at a rate of 5° C./min to 1,000° C. in a flow system of nitrogen atmosphere under normal pressure and maintained at 1,000° C. for one hour to carbonize the polymer particles. Then heating was stopped and the sample was taken out after 12 hours in which the electric furnace was cooled down to room temperature. This sample was mixed in 30 ml of a 1 mol/L sodium hydroxide solution, put into a pressure vessel and heated at 170° C. in an oven for 6 hours to dissolve the silica gel, obtaining a dispersion having the carbonized particles dispersed therein. This dispersion was centrifuged at 18,000 rpm, the supernatant solution was removed and the precipitated carbonized particles were washed with water thrice in the similar way to obtain a dispersion of carbon particles.

The dispersion was ultrasonically dispersed for 3 minutes, and randomly collected 3 droplets of the dispersion were placed on a slide and observed by an optical microscope (×100 magnification). In any of the droplets were detected no carbon particles and their flocculates having a size of 100 μm or more.

TEM (×800,000 magnification) observation of the structure of the particles in the said dispersion confirmed that the particles in the dispersion obtained in this example were the spherical carbon particles having in the inside two different forms of independent voids, with the diameter of these particles being 95 to 110 cm and their aspect ratio 1. One of the voids was a space (hollow) of a complete form enclosed by the carbon crystal wall, while the other void was one having an opening formed due to lack of a part of the carbon crystal wall and thereby communicated with the outside. It was thus confirmed that these particles had a structure in which the inside voids are communicated with the outside as shown in FIG. 1(c). In microscopic observation of these spherical carbon particles at ×80,000 magnification, there existed no flocculates in the visual field.

The state of dispersion of the particles in water was determined by a dynamic light scattering type particle size distribution meter (Microsoft USA Model 930-USA, Honeywell) to obtain the following results: diameter at the center of the distribution=145 nm; 10% volume distribution particle diameter=100 nm; 90% number distribution particle diameter=275 nm; particle diameter distribution index=1.207. Further, 10 average particles were sampled out and subjected to image processing and their radial ratios were calculated, finding that they had the radial ratios of 1.28, 1.36, 1.22, 1.15, 1.11, 1.01, 1.18, 1.05, 1.31 and 1.29, respectively. Thus, the ratio of the spherical carbon particles having a radial ratio in the range of 1.0 to 1.3 was 90% by number.

An analysis of the peak which appeared at $2\theta=25.80$ in XRD determination of crystallinity of the particles showed that the half bandwidth of the peak was 4.25° and the interplanar distance of the crystallites was 3.45 Å. Also, the result of an elemental analysis confirmed that the main component elements of the particles were carbon, nitrogen and oxygen, with their detected concentrations being 81.10% by weight, 6.30% by weight and 12.10% by weight, respectively. As for other component elements, hydrogen was not more than 0.50% by weight and silicon was not more than 1% by weight, which are below the limit of detection.

Comparative Example 1

12.8 g of an emulsion of stretched acryl particles (polymer particles: 0.1 g) prepared in the same way as in Example 1 was allowed to stand and dried for 24 hours without being dispersed in a silica gel and then the particles were carbonized in the same way as in Example 1. Thereinafter the same procedure was carried out under the same conditions as in Example 1 to obtain a dispersion of the carbonate.

TEM (×80,000 magnification) observation of the structure of the particles in the above dispersion showed that these particles were diversified in shape and size and comprised the groups of the particles whose carbon crystal structure could not be confirmed and their flocculates. Quite significantly, no void in the particles was admitted.

20 mg of the particles in the dispersion were mixed in 10 ml of water and ultrasonically dispersed for 3 minutes, and then randomly collected one droplet of the dispersion was placed on a slide and observed by an optical microscope (×100 magnification). There were observed many of those carbon particles which were 100 μm or greater in diameter.

An analysis of the peak which appeared at $2\theta=23.30$ in XRD determination of crystallinity of the particles showed that the half bandwidth of the peak was 9.0° and the interplanar distance of the crystallites was 3.81 Å.

Example 5

The fine particles of an acrylonitrile and methyl acrylate copolymer prepared in Example 2 were used. Meanwhile, 5.59 g of a methyl silicate oligomer (MS51, Mitsubishi Chemical Corporation) was mixed and dispersed in a mixed solution of 3.87 g of water and 4.94 g of ethanol, to which 1 mol/L hydrochloric acid was mixed to prepare a solution of pH 4. The solution was stirred at 50° C. for one hour to hydrolyze the methyl silicate oligomer to prepare a silica sol as a homogeneous solution.

1.58 g of this silica sol was added to 0.52 g of the said emulsion of acryl particles (polymer particles: 0.043 g), and after mixing them by shaking, the vessel was stoppered and left for 3 days to obtain a silica gel having the polymer particles dispersed therein. This gel was transferred to a glass dish and dried in vacuo at room temperature for 10 hours.

The thus obtained dry gel was subjected to a 16-hour stabilization reaction at 220° C., then heated in an electric furnace from room temperature at a rate of 5° C./min to 1,000° C. in a flow system of nitrogen atmosphere under normal pressure and maintained at 1,000° C. for one hour to carbonize the polymer particles. Then heating was stopped and the sample was taken out after 12 hours in which the electric furnace was cooled down to room temperature. This sample was mixed in 30 ml of a 1 mol/L sodium hydroxide solution, put into a pressure vessel and heated at 170° C. in an oven for 6 hours to dissolve the silica gel, obtaining a dispersion having the carbonized particles dispersed therein. This dispersion was centrifuged at 18,000 rpm, the supernatant solution was removed and the precipitated carbonized particles were washed with water three times in the similar way to obtain a dispersion of carbon particles.

The dispersion was ultrasonically dispersed for 3 minutes, and randomly collected 3 droplets of the dispersion were placed on a slide and observed by an optical microscope (×100 magnification). In any of the droplets were found no carbon particles and their flocculates having a size of 100 μm or more.

Observation by TEM (×80,000 magnification) of the structure of the particles in the dispersion confirmed that these particles were the spherical particles with their diameter ranging from 115 to 135 nm. The wall thickness was 6 to 30 nm. The ratio of the crystal wall thickness to the particle diameter was 14.4%, indicating an ample volume of the void in the particles.

Also, from observation by TEM (×800,000 magnification), the produced particles were determined to be the spherical carbon particles having in the inside only one cavity enclosed by the carbon crystal wall and an aspect ratio of 1. These hollow carbon particles were of a structure in which the carbon crystals were laminated concentrically. It was thus confirmed that they had a structure in which the crystals were laminated in the radial direction as shown in FIG. 1(b).

There were observed no flocculates in the visual field. Further, 10 average particles were sampled out and subjected to image processing and their radial ratios were calculated, finding that they had the radial ratios of 1.05, 1.12, 1.15, 1.17, 1.19, 1.19, 1.20, 1.37, 1.39 and 1.61, respectively. Thus, the ratio of the spherical carbon particles having a radial ratio in the range of 1.0 to 1.3 was 70% by number.

The state of dispersion of the particles in water was determined by a dynamic light scattering type particle size distribution meter (Microtrac USA Model 930-UPA, Honeywell) to obtain the following results: 50% volume distribution particle diameter=128 nm; 10% volume distribution particle diameter=25 nm; 90% volume distribution particle diameter=254 nm; particle diameter distribution index=1.79.

An analysis of the peak which appeared at 2θ=25.70 in XRD determination of crystallinity of the particles showed that the half bandwidth of the peak was 4.53° and the interplanar distance of the crystallites was 3.47 Å. Also, the result of an elemental analysis showed that the main component elements of the particles were carbon, nitrogen and oxygen, with their detected concentrations being 86.20% by weight, 7.21% by weight and 6.27% by weight, respectively. As for other component elements, hydrogen was not more than 0.32% by weight and silicon was not more than 1% by weight, which are below the limit of detection.

An analysis of the functional groups in the surfaces of the carbon particles of the instant embodiment was conducted by X-ray photoelectron spectroscopy and the peaks of C—OH, C=O and COOR were confirmed from peak separation. Also, in determination by Fourier transform infrared spectroscopy (using the diffuse reflection method), OH stretching vibration was observed at around 3,400 $cm^{-1}$, confirming the presence of OH groups.

What is claimed is:

1. Spherical carbon particles of 5 nm to 100 μm in diameter having a void or voids enclosed by the carbon crystal wall, which particles have a structure such that the ends of the carbon net plane are exposed or the ends of the carbon net plane are joined together to form a looped structure at least at a part of the outer periphery of the particles.

2. A dispersion of spherical carbon particles produced by dispersing the spherical carbon particles as defined in claim 1 in a dispersant.

3. An aggregate of spherical carbon particles having a void or voids enclosed by the carbon crystal wall, which aggregate has such a property that regarding a dispersion thereof prepared in the manner described below, the particle diameter distribution index represented by the following formula (I), measured after 24-hour standing after preparation of the dispersion, is 0.1 to 20 wherein the dispersion is prepared by placing 3 ml of a dispersant and 1 mg of a sample into a glass vessel having an inner diameter of 13 mm and a capacity of 5 ml and, after fixing the cover in position, the vessel is shaken by an ultrasonic shaker for one minute under the conditions of 120 W high-frequency output and 38 kHz oscillating frequency to disperse the sample and formula (I) is: particle diameter distribution index=[(diameter of 90 vol % of particles counted from the smallest diameter)−(diameter of 10 vol % of particles counted from the smallest diameter)]/(diameter of 50 vol % of particles counted from the smallest diameter), wherein said spherical carbon particles are of 5 nm to 100 μm in diameter, which particles have such a structure that the ends of the carbon net plane are exposed or the ends of the carbon net plane is looped at least at a part of the outer periphery of the particles.

4. A method of producing spherical carbon particles having a void or voids enclosed by a carbon crystal wall which method comprises using as base material precursor spherical particles having a diameter of 5 nm to 100 μm, and carbonizing said base material in a state of being covered with a heat-resistant material so as to maintain its shape.

5. The method according to claim 4 wherein the precursor spherical particles are made of a liquid-phase carbonizable material or a pyrolitic decomposable polymer-containing material.

* * * * *